Patented Feb. 5, 1946

2,394,512

UNITED STATES PATENT OFFICE 2,394,512

UNSATURATED ESTERS OF HALO-ARYLOXY ALCOHOLS

Gerald H. Coleman and Bartholdt C. Hadler, Midland, Mich., assignors to The Dow Chemical Company, Midland, Mich., a corporation of Michigan No Drawing. Application February 17, 1942,
Serial No. 431,292

6 Claims. (Cl. 260—485)

This invention concerns esters of halo-aryloxy-substituted alcohols with certain unsaturated aliphatic dicarboxylic acids, said esters having the general formula:

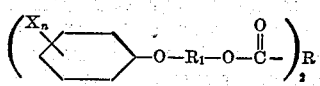

wherein X represents a halogen substituent selected from the group consisting of chlorine and bromine; $R_1$ represents a lower alkylene radical containing at least two carbon atoms, the free valences of said radical being borne by different carbon atoms; R represents an aliphatic hydrocarbon radical containing not more than ten carbon atoms and at least one ethylenic linkage; and $n$ represents the number of substituents on the aryl nucleus and is not greater than 4. The phenyl radical may contain, in addition to the halogen substituents, other neutral substituents such as an alkyl radical. All such esters are high-boiling liquids or crystalline solids which are substantially insoluble in water but are readily soluble in many organic solvents. They are useful as plasticizing and modifying agents for vinyl resins, e. g. polystyrene, and cellulose derivative (e. g. ethyl cellulose, cellulose acetate, etc.) compositions.

The unsaturated esters of the present class are conveniently prepared by esterifying a halo-aryloxy-substituted alcohol, e. g. beta- (2-chlorophenoxy) ethanol, beta - (2,4 - dibromophenoxy) propanol, etc., with an aliphatic dicarboxylic acid which contains not more than ten carbon atoms and at least one ethylenic linkage in the aliphatic residue, e. g. maleic acid, glutaconic acid, etc. The reaction may be carried out by heating at a suitable temperature, e. g. about 60°–150° C., a mixture of the alcohol with approximately one chemical equivalent of the unsaturated carboxylic acid and a small proportion of an esterification catalyst, e. g. approximately 0.01–0.04 molecular equivalent of a strong acid, such as sulfuric or benzene sulfonic acid. Water is formed in the reaction and, if desired, a water-immiscible organic solvent, such as benzene or toluene, may be added to the reaction mixture for the purpose of promoting distillation and removal of the water during the esterification. Upon completion of the reaction, the mixture is treated with sufficient alkali to neutralize any free acid, washed with water, and the ester product is separated and purified by fractional distillation or crystallization.

The following examples are illustrative of the preparation of several of the esters of the present class, but are not to be construed as limiting the invention:

Example 1

A mixture of 145 grams (0.6 mol) of beta-(2,4,6-trichlorophenoxy)ethanol, 40 grams (0.25 mol) of maleic acid, 5 grams of benzene sulfonic acid, and 250 cc. of benzene was heated to a temperature of about 82° C. for about 2 hours, water being distilled from the mixture as formed. The reaction mixture was cooled and treated with a saturated solution of sodium bicarbonate. An emulsion which formed during the latter treatment was broken by the addition of 250 cc. of benzene. The benzene solution was then treated with two 250 cc. portions of distilled water. The benzene was removed by distillation and the crude ester was crystallized from a petroleum fraction of boiling range 60°–100° C. The purified ester, di-(2,4,6-trichlorophenoxy ethyl)maleate, had a melting point of 76.5°–78° C. and has the formula:

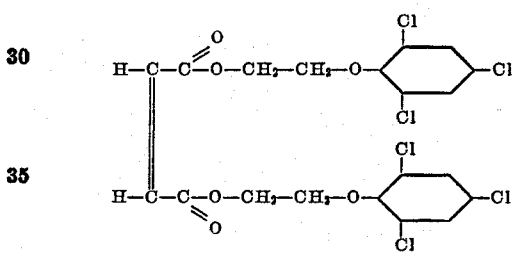

Example 2

A mixture of 21.5 grams (0.088 mol) of 2-(2-bromo-4-ethyl-)phenoxy ethanol, 4.64 grams (0.04 mol) of maleic acid, 3 grams of benzenesulfonic acid, and 200 cc. of benzene was heated to a temperature of about 82° C. for about 2½ hours, at which time water had ceased to be evolved. The reaction mixture was cooled and washed with 250 cc. of a saturated sodium bicarbonate solution and with two portions of 250 cc. of distilled water. Most of the benzene was removed under vacuum and the residual benzene was removed by passing a stream of air through the warm material. The ester product, di-(beta-(2-bromo-4-ethyl-phenoxy)ethyl) maleate, is a viscous liquid and has a specific gravity at $\frac{25°}{25°}$ of 1.4180 and a refractive index at $\frac{25°}{D}$ of 1.5620 and has the formula:

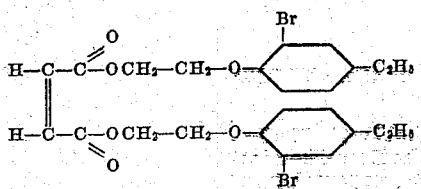

Other unsaturated halo-aryloxy alkyl esters of the present class may be prepared by the general method illustrated by the foregoing examples; for example, 4-chlorophenoxy propanol may be reacted with glutaconic acid to produce di-(4-chlorophenoxy propyl) glutaconate, 2-bromophenoxy ethanol with citraconic acid to produce di-(2-bromophenoxy ethyl) citraconate, 2,4-dichlorophenoxy propanol with itaconic acid to produce di-(2,4-dichlorophenoxy propyl)itaconate, 2,4,6-tri-bromophenoxy ethanol with mesaconic acid to produce di-(2,4,6-tribromophenoxy ethyl) mesaconate, 2-chloro-4-tertiary butyl phenoxy ethanol with maleic acid to produce di-(2-chloro-4-tertiary butyl phenoxy ethyl) maleate, 2,4-dichloro-6-sec. butyl phenoxy ethanol with fumaric acid to produce di-(2,4-dichloro-6-sec. butyl phenoxy ethyl) fumarate, etc.

This application is a continuation-in-part of our copending application Serial No. 321,314, filed February 28, 1940 which, in turn, is a continuation-in-part of application Serial No. 177,655, filed December 1, 1937.

We claim:

1. A neutral ester of a halo-aryloxy-substituted lower alcohol, wherein the aromatic radical is a mono-cyclic radical of the benzene series, the halogen is selected from the class consisting of chlorine and bromine, and said lower alcohol radical contains at least two and less than four carbon atoms none of which carbon atoms has more than a single oxygen atom attached thereto, and an aliphatic dicarboxylic acid containing not more than 10 carbon atoms and a single ethylenic linkage in the aliphatic radical.

2. A neutral ester of a haloaryloxy-substituted alcohol and an unsaturated aliphatic dicarboxylic acid, said ester having the general formula

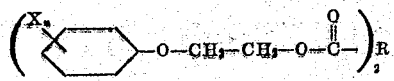

wherein X represents a halogen substituent selected from the group consisting of chlorine and bromine, R represents an aliphatic hydrocarbon radical containing not more than 10 carbon atoms and a single ethylenic linkage, and $n$ represents an integer not greater than 4.

3. A neutral ester of a chloroaryloxy-substituted alcohol and an unsaturated aliphatic dicarboxylic acid, said ester having the general formula

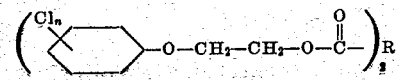

wherein R represents an aliphatic hydrocarbon radical containing not more than 10 carbon atoms and a single ethylenic linkage, and $n$ represents an integer not greater than 4.

4. A neutral ester of a bromoaryloxy-substituted alcohol and an unsaturated aliphatic dicarboxylic acid, said ester having the general formula

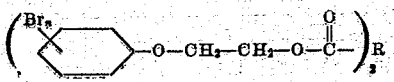

wherein R represents an aliphatic hydrocarbon radical containing not more than 10 carbon atoms and a single ethylenic linkage, and $n$ represents an integer not greater than 4.

5. Di-(beta-(2,4,6-trichlorophenoxy)ethyl) maleate.

6. Di-(beta-(2-bromo-4-ethyl phenoxy)ethyl) maleate.

GERALD H. COLEMAN.
BARTHOLDT C. HADLER.